United States Patent
Benjamin et al.

(10) Patent No.: US 11,016,889 B1
(45) Date of Patent: May 25, 2021

(54) STORAGE DEVICE WITH ENHANCED TIME TO READY PERFORMANCE

(71) Applicant: Seagate Technology LLC, Cupertino, CA (US)

(72) Inventors: Daniel John Benjamin, Savage, MN (US); Ryan Charles Weidemann, Victoria, MN (US); Ryan James Goss, Prior Lake, MN (US); David W. Claude, Loveland, CO (US); Graham David Ferris, Savage, MN (US)

(73) Assignee: Seagate Technology LLC, Fremont, CA (US)

( * ) Notice: Subject to any disclaimer, the term of this patent is extended or adjusted under 35 U.S.C. 154(b) by 32 days.

(21) Appl. No.: 16/714,121

(22) Filed: Dec. 13, 2019

(51) Int. Cl.
*G06F 3/06* (2006.01)
*G06F 12/0804* (2016.01)
*G06F 12/02* (2006.01)
*G06F 12/10* (2016.01)

(52) U.S. Cl.
CPC ...... *G06F 12/0804* (2013.01); *G06F 12/0253* (2013.01); *G06F 12/10* (2013.01); *G06F 2212/1032* (2013.01); *G06F 2212/1044* (2013.01)

(58) Field of Classification Search
CPC .. G06F 12/0253; G06F 12/10; G06F 12/0804; G06F 2212/1044; G06F 2212/1032
USPC ........................................................ 711/103
See application file for complete search history.

(56) References Cited

U.S. PATENT DOCUMENTS

| | | | |
|---|---|---|---|
| 7,272,830 | B2 | 9/2007 | de Jong |
| 7,769,945 | B2 | 8/2010 | Lasser et al. |
| 8,015,350 | B2 | 9/2011 | Feldman et al. |
| 8,707,300 | B2 | 4/2014 | Govindan et al. |
| 8,793,429 | B1 | 7/2014 | Call et al. |
| 8,862,806 | B2 | 10/2014 | Yoon et al. |
| 9,037,717 | B2 | 5/2015 | Canturk et al. |
| 9,195,583 | B2 | 11/2015 | Jung et al. |
| 9,411,717 | B2 | 8/2016 | Goss et al. |
| 10,025,522 | B2 | 7/2018 | Helmick |
| 10,126,964 | B2 | 11/2018 | Munsil et al. |
| 10,296,234 | B2 | 5/2019 | Chen et al. |
| 2014/0115232 | A1* | 4/2014 | Goss ............. G06F 11/1471 711/103 |

(Continued)

*Primary Examiner* — Hashem Farrokh
(74) *Attorney, Agent, or Firm* — Hall Estill Attorneys at Law

(57) ABSTRACT

Method and apparatus for enhancing power cycle performance of a storage device, such as a solid-state drive (SSD). In some embodiments, map data that describe the contents of a non-volatile memory (NVM) are arranged as snapshots and intervening journal updates. During a scram interval in which the storage device transitions to a powered down condition, the snapshots and journal updates for primary segments with high client interest are updated prior to storage to the NVM. During a reinitialization interval in which the storage device transitions to a powered up condition, the updated primary segments are loaded, after which the storage device provides the client device with an operationally ready notification. Remaining secondary segments are updated and loaded after the notification. The primary segments are identified based on a detected workload from the client device. Configuration changes can further be made based on the detected workload.

20 Claims, 6 Drawing Sheets

(56) References Cited

U.S. PATENT DOCUMENTS

2014/0304454 A1* 10/2014 Ellis .................. G06F 12/0802
 711/103
2016/0154594 A1   6/2016 Kang
2019/0196969 A1   6/2019 Yang et al.
2020/0004670 A1* 1/2020 Williams ........... G11C 16/0483

* cited by examiner

STORAGE DEVICE WITH ENHANCED TIME TO READY PERFORMANCE

SUMMARY

Various embodiments of the present disclosure are generally directed to a method and apparatus for enhancing performance of a storage device, such as a solid-state drive (SSD).

In some embodiments, map data that describe the contents of a non-volatile memory (NVM) are arranged as snapshots and intervening journal updates. During a scram interval in which the storage device transitions to a powered down condition, the snapshots and journal updates for primary segments with high client interest are updated prior to storage to the NVM. During a reinitialization interval in which the storage device transitions to a powered up condition, the updated primary segments are loaded, after which the storage device provides the client device with an operationally ready notification. Remaining secondary segments are updated and loaded after the notification. The primary segments are identified based on a detected workload from the client device. Configuration changes can further be made based on the detected workload.

These and other features and advantages which characterize the various embodiments of the present disclosure can be understood in view of the following detailed discussion and the accompanying drawings.

DETAILED DESCRIPTION

Figure 1:
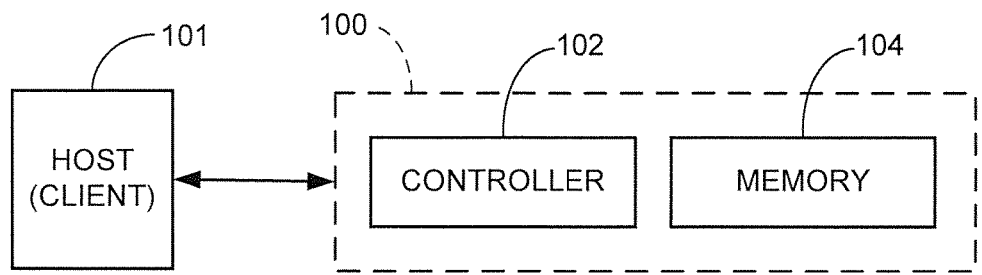
FIG. 1 provides a functional block representation of a data storage device constructed and operated in accordance with various embodiments of the present disclosure.

The present disclosure generally relates to systems and methods for managing data in a data storage device, such as but not limited to a solid-state drive (SSD).

Storage devices generally include a controller and non-volatile memory (NVM). The controller communicates with a host (client) device to manage the storage and retrieval of user data to and from the NVM. Solid-state drives (SSDs) are one form of storage device that use solid-state semiconductor memory, such as NAND flash, to store the user data. The flash is often arranged as a number of flash semiconductor dies that are accessible via channels (lanes).

NAND flash, as well as certain other forms of semiconductor memory, tend to require an intervening erasure operation before new data can be written to a given location. New versions of a given set of user data blocks from the client are written to a new location within the NVM, rather than being overwritten to an existing location that stores the older version blocks. Mapping data structures (metadata) are maintained to identify the locations of the most current versions of the data. Garbage collection (GC) operations are used to relocate current versions of data and erase older (stale) versions to reclaim the memory locations for subsequent use in storing new data. GC operations may be carried out on a GCU (garbage collection unit) basis, which may be formed from multiple erasure blocks that span a collection of different dies and which are allocated and erased as a unit.

It follows that storage devices with erasable memories can have a significant background processing overhead. The controller not only operates to service pending client read and write commands, but also performs metadata updates and GC operations while maintaining a desired operational data transfer performance level (and available storage capacity) for the client.

It is generally desirable to transition a storage device such as an SSD from a powered down state to an operationally ready state in a fast and efficient manner. This initialization time is sometimes referred to as "Time to Ready," or "TTR."

One of the actions that can take a significant amount of time during this initialization phase is to locate and load the metadata that describes the system to a local memory, such as DRAM, for access by the controller. The greater the capacity of the NVM, the greater amount of metadata will be needed to describe the contents of the NVM.

To give one nonlimiting example, each terabyte, TB ($10 \times 10^{12}$ bytes) of flash in an SSD may require one gigabyte, GB ($10 \times 10^9$ bytes) or more of metadata to describe the contents of that 1 TB of flash, depending on the metadata granularity. As will be appreciated, loading several gigabytes of memory, even into a fast volatile memory such as DRAM, can take an appreciable amount of time. Planned continued increases in SSD capacity (e.g., 16 TB, 32 TB, etc.) will only serve to exasperate this problem.

A related factor that can extend the required TTR is that FTL metadata may be divided up into segments that describe different portions of the flash memory. Each of the segments may be stored to different locations (e.g., die/channel combinations) to enhance reliability and facilitate parallel transfer. It is common to arrange the FTL metadata as a series of periodic snapshots with intervening journal updates. The journal updates show changes made since the most recent snapshot. Hence, the metadata loading process may require combining the snapshots with the updates to arrive at the most current version of the state of the system. Such updates may need to take place serially (e.g., one after another) rather than in parallel. Generally, the metadata needs to be successfully loaded before the SSD (or other storage device) can begin servicing client data transfer commands during normal operation.

The power down cycling of a storage device is sometimes referred to as a scram. During a scram interval, the controller usually only has a limited amount of available time and power to prepare the storage device for the next subsequent initialization. Various steps need to be successfully accomplished, such as the saving of any pending write data to NVM, the updating and storage of the map metadata, the storage of various state parameters, and so on.

Generally, it has been found that each additional increment of time (such as each second, sec) that the SSD or other storage device can use to process data during the scram interval tends to save essentially that same amount of increment of time during the subsequent reinitialization of the device. Accordingly, there is a continual need to enable a storage device to effectively prepare and respond to a power cycle operation, including the management and storage of accurate metadata before the device loses power and the efficient loading of the metadata once power resumes.

Various embodiments of the present disclosure are generally directed to a method and apparatus for enhancing operational performance of a storage device, such as but not limited to an SSD. As explained below, the storage device includes a controller circuit and a non-volatile memory (NVM). Metadata (also sometimes referred to as flash transition layer data, FTL data, map data, etc.) are arranged as a data structure as a plurality of segments for different locations within the NVM. Each segment may be arranged as a series of snapshots with one or more intervening journal updates.

During normal operation, the controller circuit accumulates history data. The history data characterizes a rate at which the data associated with the respective segments are accessed and updated. The updates may arise as a result of data transfer (e.g., read, write, etc.) commands from a client device.

In response to receipt of a power down indication indicating that a power down event is imminent for the storage device (e.g., the storage device enters a scram mode), at least a selected one of the segments is updated using the associated snapshot(s) and journal update(s) to form an updated segment, and the updated segment is stored to the NVM. The segment(s) selected for this scram processing are identified based on the history data as primary segments. Remaining segments may be characterized as secondary segments.

During a subsequent initialization operation in which the storage device is transitioned from a powered down state to an operationally ready state, the updated primary segments are loaded prior to the other secondary segments that still include journal updates. Once all of the updated primary segments have been loaded, an indication is forwarded to the client that the storage device is in an operationally ready state to receive data transfer commands. Even though not all of the metadata segments may have been updated and loaded at this time, the device can proceed to service commands for the loaded segments.

The storage device uses the history data to assess which metadata segments will likely be accessed and used first by the client, and gives these metadata segments priority during the scram and loading sequences. Without limitation, the history data can characterize a client workload including as follows: sequential v. random accesses; identification of hot data v. cold data; the use of NVMe namespaces; the locality of data accesses, both logically and physically; big v. small data transfers; queue depths; instant v. historical accesses; write dominated v. read dominated accesses, and so on.

Some interface configurations allow a device to request the client to identify a particular type of workload to expect. However, the system is not so limited, in that the storage device can accurately infer the workload from current and past access requests and other client behavior.

The history data is used by the storage device to anticipate and predict the type of workload to expect once normal operation has resumed. Segments that describe data blocks more likely to be accessed by the client upon initialization are loaded first. The controller circuit can further operate to change the device configuration based on workload, such as adjusting the frequency and aggressiveness of background processing (map updates, garbage collection, map granularity) while maintaining a desired quality of service (QoS) for the client during normal operation.

In one example, a histogram may be generated as a log of the last N detections, where N is a selected number to cover a reasonable amount of time. The data may be analyzed based on physical or logical locality, or other factors. In some cases, different strategies may be applied to different data sets (such as different chunks of the logical space, etc.). Similarly, different techniques may be applied for hot data, cold data, intermediate data, etc.

In another example, if the client unmaps a set of data (so that the client will not require that data any further), the controller circuit may be able to predict a write together/ write sequential data chunk may be arriving in the near future. Another example in which the controller circuit can estimate/detect upcoming operations is to track the number of GCUs that are affected; if X blocks of data were unmapped from a single GCU the data are likely sequential, while if the X blocks are distributed among a large number of GCUs the data are more likely random.

In further embodiments, information may be shared between different storage devices in a larger, multi-device array. The storage devices can notify a host controller issuing a virtual detection scorecard. For example, the host controller may behave as it is operating in a sequential mode, but the devices can indicate that in actuality the data are more random or non-local, etc.

Some cases involve retaining the collected history data over multiple power cycle events. This can enable the controller circuit to identify a rate at which the client workload changes over time (e.g., fast or slow, etc.). Expected usage versus what is actually used by the client upon initialization can be collected and analyzed to further adaptively change the metadata loading pattern. In some cases with highly variable workloads, it may turn out that a "clean slate" at power up is more efficient; that is, it may be better to reconfigure the SSD to operate as it was prior to the cycling event, or it may be better to jettison the prior workload information at the next power up and begin afresh. The metrics can be evaluated to determine an optimum operational, scram and power up strategy.

These and other features and advantages of various embodiments can be understood beginning with a review of FIG. 1, which provides a functional block representation of a data storage device 100. The storage device is coupled to a host (client) device 101.

The device 100 includes a controller circuit 102 which provides top-level control and communication functions for the client 101, and a memory module which 104 provides non-volatile memory (NVM) for the storage of user data from the client. The controller 102 may be a programmable CPU processor that operates in conjunction with programming stored in a computer memory within the device. The controller may alternatively be a hardware controller. The controller may be a separate circuit or the controller functionality may be incorporated directly into the memory array 104.

As used herein, the term controller and the like will be broadly understood as an integrated circuit (IC) device or a group of interconnected IC devices that utilize a number of fundamental circuit elements such as but not limited to transistors, diodes, capacitors, resistors, inductors, waveguides, circuit paths, planes, printed circuit boards, memory elements, etc. to provide a functional circuit regardless whether the circuit is programmable or not. The controller may be arranged as a system on chip (SOC) IC device, a programmable processor, a state machine, a hardware circuit, a portion of a read channel in a memory module, etc.

Figure 2:
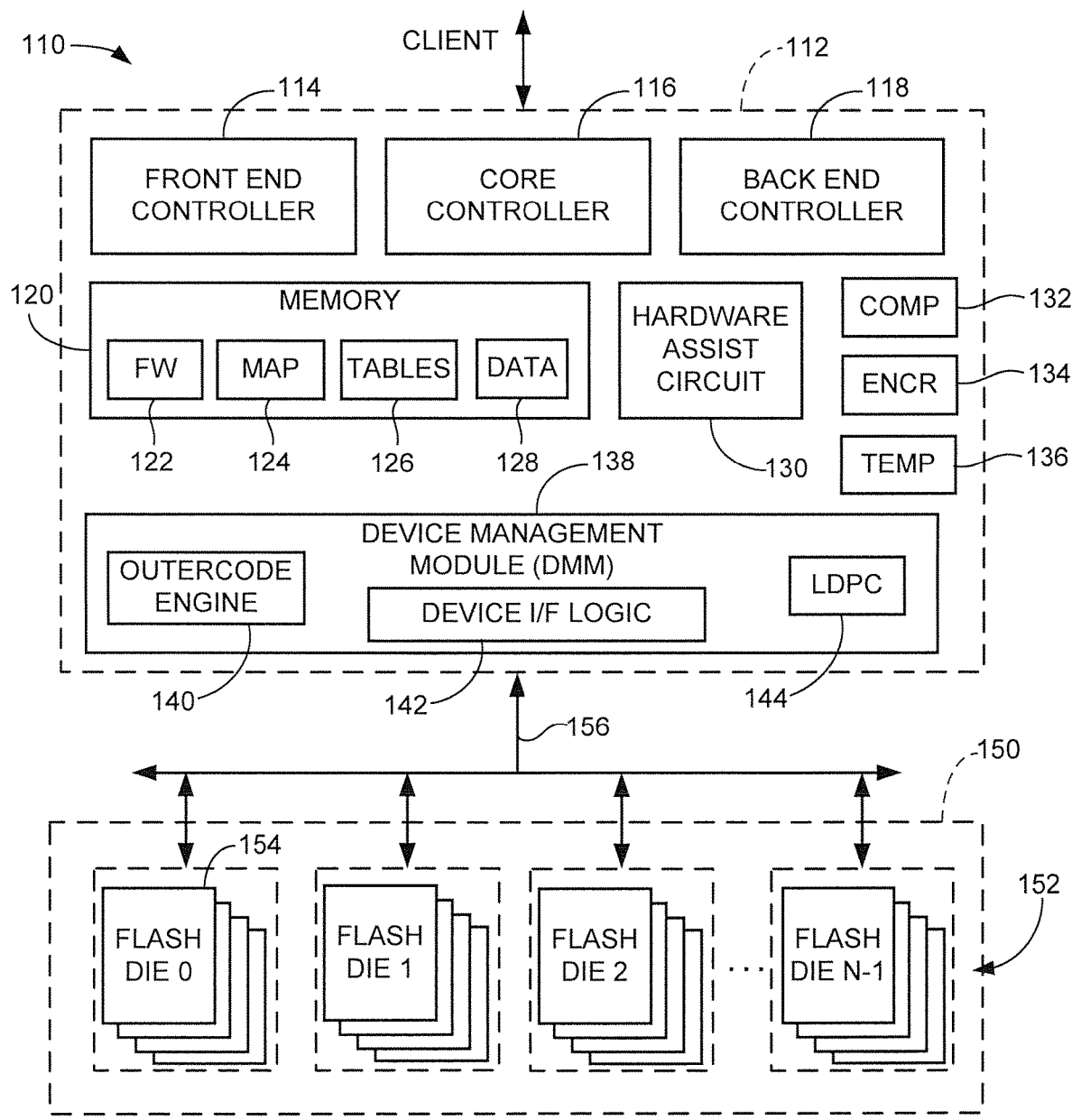
FIG. 2 illustrates the device of FIG. 1 characterized as a solid-state drive (SSD) in accordance with some embodiments.

In order to provide a detailed explanation of various embodiments, FIG. 2 describes relevant aspects of an exemplary data storage device 110 corresponding to the device 100 of FIG. 1. The device 110 is shown in FIG. 2 to be configured as a solid state drive (SSD) that communicates with one or more client devices via one or more Peripheral Component Interface Express (PCIe) ports. The NVM is contemplated as comprising 3D NAND flash memory, although other forms of memory can be used.

In at least some embodiments, the SSD operates in accordance with the NVMe (Non-Volatile Memory Express) specification, which enables different users to allocate NVM sets (die sets) for use in the storage of data. Each die set may form a portion of an NVMe namespace that may span multiple SSDs or be contained within a single SSD. Each NVMe namespace will be owned and controlled by a different user (owner). While aspects of various embodiments are particularly applicable to devices operated in accordance with the NVMe Standard, such is not necessarily required.

The SSD 110 includes a controller circuit 112 with a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including loaded firmware (FW) 122, map data 124, table data 126 and user data 128 in read/write buffers temporarily cached during host data transfers.

A non-processor based hardware assist circuit 130 may enable the offloading of certain memory management tasks by one or more of the controllers as required. The hardware circuit 130 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in or adjacent the controller 112, such as a data compression block 132, an encryption block 134 and a temperature sensor block 136. These elements can be realized using hardware/firmware as required. The data compression block 132 applies lossless data compression to input data sets during write operations to enhance storage efficiency. It is contemplated albeit not required that all of the user data supplied for storage by the SSD 110 will be compressed prior to storage to the flash memory.

The encryption block 134 applies suitable compression and other cryptographic processing to provide data security for the SSD. The temperature block 136 may include one or more temperature sensors that monitor and record temperatures of the SSD during operation.

A device management module (DMM) 138 supports back end processing operations and may include an outer code engine circuit 140 to generate outer code, a device I/F logic circuit 142 and a low density parity check (LDPC) circuit 144 configured to generate and use LDPC codes as part of an error detection and correction strategy to protect the data stored by the SSD 110.

A memory module 150 corresponds to the memory 104 in FIG. 1 and includes a non-volatile memory (NVM) in the form of a flash memory 152 distributed across a plural number N of flash memory dies 154. Flash memory control electronics (not separately shown in FIG. 2) may be provisioned to facilitate parallel data transfer operations via a number of channels (lanes) 156.

Figure 3:
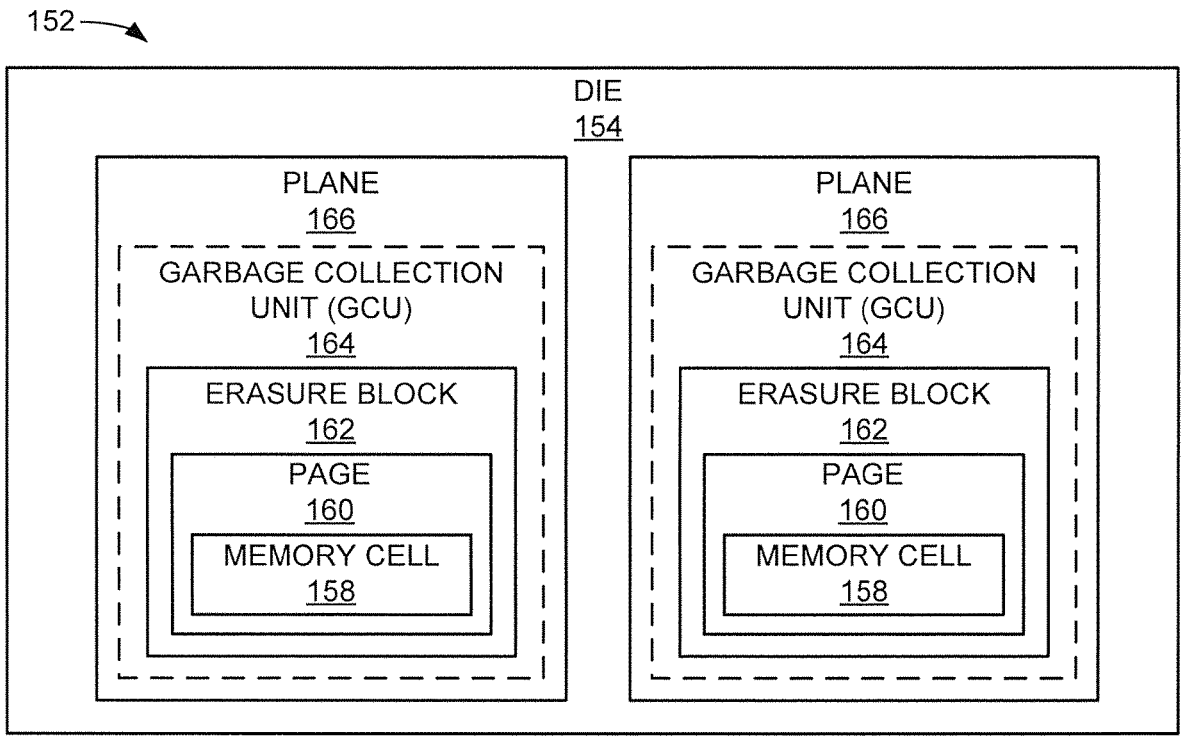
FIG. 3 shows a physical and logical layout of a flash die from FIG. 2 in some embodiments.

FIG. 3 shows a physical/logical arrangement of the various flash memory dies 154 in the flash memory 152 of FIG. 2 in some embodiments. Each die 154 incorporates a large number of flash memory cells 158. The cells may be arrayed in a two-dimensional (2D) or three-dimensional (3D stacked) arrangement with various control lines (e.g., source, bit, word lines) to access the cells.

Groups of cells 158 are interconnected to a common word line to accommodate pages 160, which represent the smallest unit of data that can be accessed at a time. Depending on the storage scheme, one or more pages of data may be written to the same physical row of cells, such as in the case of SLCs (single level cells with one bit per cell), MLCs (multi-level cells with two bits per cell), TLCs (three-level cells with three bits per cell), QLCs (four-level cells with four bits per cell), and so on. Generally, n bits of data can be stored to a particular memory cell 158 using $2^n$ different charge states (e.g., TLCs use eight distinct charge levels to represent three bits of data, etc.). The storage size of a page can vary; some current generation flash memory pages are arranged to store 32 KB (32,768 bytes) of user data plus associated LDPC code bits.

The memory cells 158 associated with a number of pages are integrated into an erasure block 162, which represents the smallest grouping of memory cells that can be concurrently erased in a NAND flash memory. A number of erasure blocks 162 are turn incorporated into a garbage collection unit (GCU) 164, which are logical storage units that utilize erasure blocks across different dies and which are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location (e.g., a new GCU), followed by an erasure operation to reset the memory cells to an erased (unprogrammed) state. The recycled GCU is returned to an allocation pool for subsequent allocation to begin storing new user data. In one embodiment, each GCU 164 nominally uses a single erasure block 162 from each of a plurality of dies 154, such as 32 dies.

Each die 154 may further be organized as a plurality of planes 166. Examples include two planes per die as shown in FIG. 3, although other numbers of planes per die, such as four or eight planes per die can be used. Generally, a plane is a subdivision of the die 154 arranged with separate read/write/erase circuitry such that a given type of access operation (such as a write operation, etc.) can be carried out simultaneously by each of the planes to a common page address within the respective planes.

Figure 4:
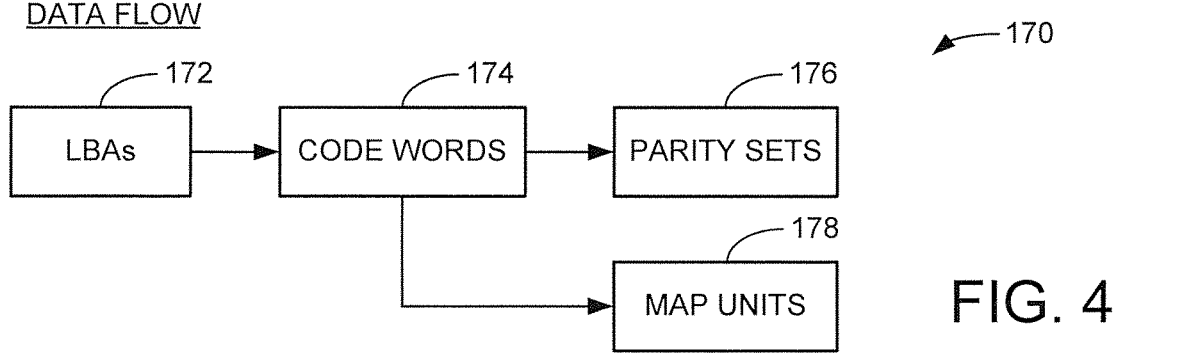
FIG. 4 illustrates a data flow for data stored by the SSD.

Input data from a client device such as 101 are stored in a manner such as illustrated by a data flow sequence 170 in FIG. 4. Other arrangements can be used. Blocks of data with associated logical addresses such as logical block addresses, LBAs, are presented at 172. The blocks are arranged into code words 174, which include user data bits and error correction code (ECC) bits to facilitate recovery during a read operation. The ECC bits may take the form of LDPC (low density parity check) bits.

A selected number of the code words may be arranged into pages, and a selected number of pages may in turn be arranged into parity sets 176. In one non-limiting example, 31 pages of code words are combinatorially combined to generate a parity value as a $32^{nd}$ page, and then all 32 pages of the parity set is written to a selected GCU. The parity value operates as outer code. Using a GCU size of 32 erasure blocks with one erasure block from each die, the outer code can facilitate data recovery even in the instance of a single die failure.

For mapping purposes, groups of the code words 174 are further arranged into map units 178. Map units represents groupings that enable the mapping system of the SSD to locate and retrieve the code words stored to the flash memory.

Figure 5:
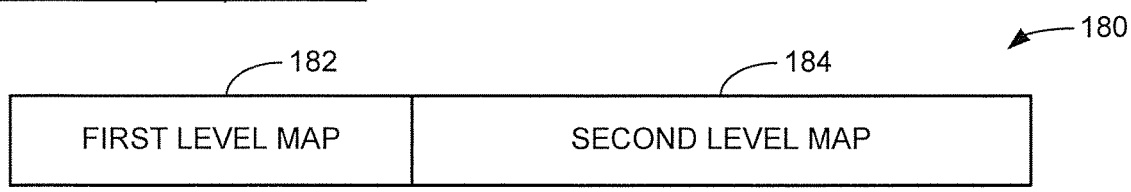
FIG. 5 is a format for map metadata used by the SSD.

A two level map 180 is represented in FIG. 5. Other mapping structures can be used including a single level map, a multi-level map with more than two levels, etc. The map 180 includes a first level map 182 and a second level map 184. The second level map 184 operates as a flash transition layer (FTL) with a physical to logical association of addresses to enable location of the desired user data blocks. The first level map 182 generally indicates the locations of map descriptors that in turn identify the locations of the map units 178 in the second level map 184. Some, most or all of the first and second level maps 182, 184 may be loaded to local memory for use by the controller 112.

A typical data access sequence to service a client data transfer command may include accessing the first level map to identify the appropriate entry in the second level map, and accessing the second level map to identify the location in flash where the associated user data blocks are located. In the case of a read operation, the user data blocks are retrieved for further processing and return to the requesting client; in the case of a write operation, the new data blocks are written to a new location, and the metadata is updated. Maintaining accurate map metadata is generally necessary to enable the SSD 110 to accurately identify the current state of the system, and reliably service client access commands. Protection schemes such as error correction coding, redundant copies, etc. are applied to ensure the integrity of the map data.

Figure 6:
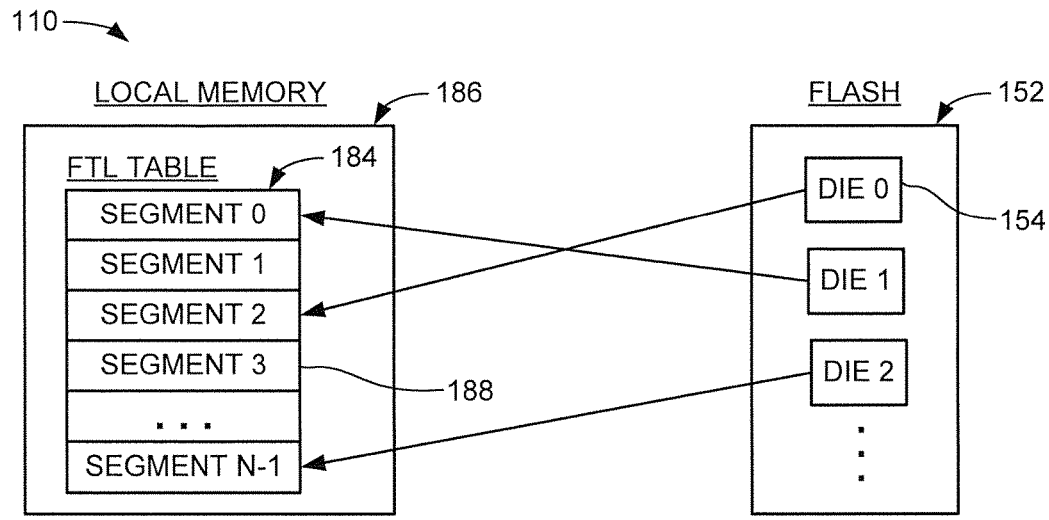
FIG. 6 depicts the map metadata in greater detail in some embodiments.

FIG. 6 shows an arrangement of the second level map 184 from FIG. 5 in some embodiments. The second level map, also referred to as an FTL table, is loaded from flash 152 to a local memory 186 during initialization. The local memory 186 may comprise volatile memory such as DRAM, etc. The local memory may be utilized for other purposes as well, as illustrated in FIG. 2 for the local memory 120. Depending on size and operational constraints, some or all of the FTL table may be present in the local memory 186 at a given time.

The FTL table 184 is made up of N segments 188. In one example, there are a total of 32 segments (N=32), although other numbers of segments can be used. Each segment 188 may in turn be divided into some number M sub-segments (not separately shown in FIG. 6), such as 32 sub-segments (M=32). The segments 188 describe different portions of the NVM flash.

In some embodiments, the segments 188 will be divided on a logical basis, so that for a total range of logical addresses that can be used by the client (e.g., from LBA 0 to LBA X), each segment will generally encompass $\frac{1}{32}$ of this entire space (and each sub-segment will describe $\frac{1}{32}$ of each segment). Other arrangements can be used, however, including segments that are dedicated to specific NVMe namespaces, segments that are apportioned to different physical entities (e.g., die sets), and so on. The segments 188 may be of equal size or may have different sizes. The segments may be distributed on and loaded from different dies 154, allowing for redundancy and parallel loading using different channels 156 (see FIG. 2).

Figure 7:
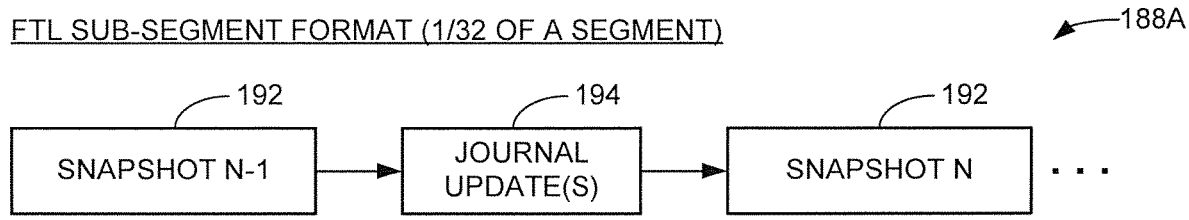
FIG. 7 illustrates a selected map metadata segment from FIG. 6.

FIG. 7 shows an arrangement of a selected sub-segment 188A in some embodiments. Because of the essentially continual updates of the map data due to write updates, GC operations, relocation of data due to read disturb and other effects, the sub-segments 188A are arranged as a sequence of snapshots 190 and intervening journal updates 192. A snapshot 190 represents the state of the associated metadata at a selected period of time. A journal update 192 is an update list that shows changes to the most recent snapshot. Using the above example with 32 sub-segments per segment, each segment will potentially have up to 32 separate snapshots and 32 (or more) sets of journal updates, all of which describe the overall metadata of the associated segment. This is not necessarily required, as each segment could instead have a single series of snapshots and intervening journal updates.

Any number of journal updates 192 can be formed between successive snapshots 190. A new snapshot can be formed by updating the previous snapshot with the updated journal information.

In some cases, once a selected number of journal update entries have been accumulated, the controller 112 may schedule the generation of a new snapshot. In other cases, the controller 112 may schedule the generation of new snapshots on a predetermined time basis irrespective of the number of journal update entries that have accrued in the interim. The loading sequence of FIG. 6 will include the need to combine at least some snapshots and journal updates to arrive at the most recent state for each segment. Monitoring the rate at which journal updates are thereafter generated can provide insight into the activity (workload) associated with the corresponding segment during normal operation of the SSD.

Figure 8:
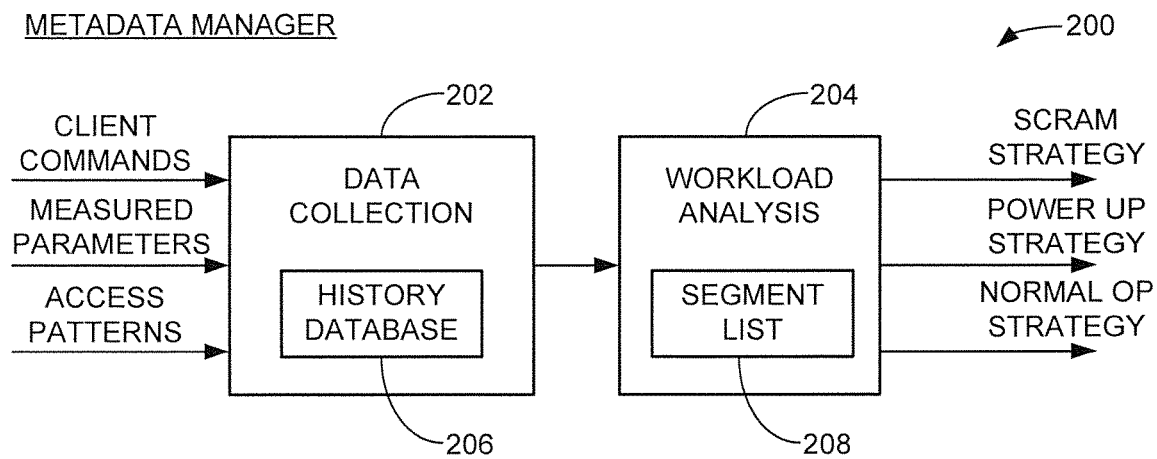
FIG. 8 is a functional block representation of a metadata manager circuit of the SSD constructed and operated in accordance with some embodiments.

FIG. 8 is a functional block representation of a metadata manager circuit 200 of the SSD 110 in accordance with some embodiments. The metadata manager circuit 200 may be realized as a portion of the controller 112. The circuit 200 includes a data collection module 202 and a workload analysis module 204. The data collection module 202 maintains a history database 206 and the workload analysis module 204 maintains a segment list 208. Other arrangements can be used.

Generally, the metadata manager circuit 200 operates as a background routine to analyze and assess workload conditions for the SSD 110. To this end, the data collection module 202 collects history data based on a number of system inputs. These can include client commands, various measured parameters, access patterns, etc. The history data can be of any suitable form and gives insight into the needs of the system from the client standpoint. The accumulated history data are stored in the history database 206 as a data structure in memory.

The workload analysis module 204 uses the history data from the database 206 to characterize client workload trends. Without limitation, the client workload can be characterized in a number of useful ways, including as follows: sequential v. random accesses; identification of hot data v. cold data; the use of NVMe namespaces; the locality of data accesses, both logically and physically; big v. small data transfers; queue depths; instant v. historical accesses; write dominated v. read dominated accesses, and so on.

The characterization of the workload enables the manager circuit 200 to identify those segments 188 of the FTL table 184 that are most likely to be utilized during operation, including the direct servicing of client data transfer commands as well as the indirect servicing of the client through the proper scheduling of background processing operations (GC operations, map updates, etc.). The segments found to be of primary utilization are added to the segment list 208, and help form the basis of suitable scram, power up and normal operational strategies.

Figure 9:
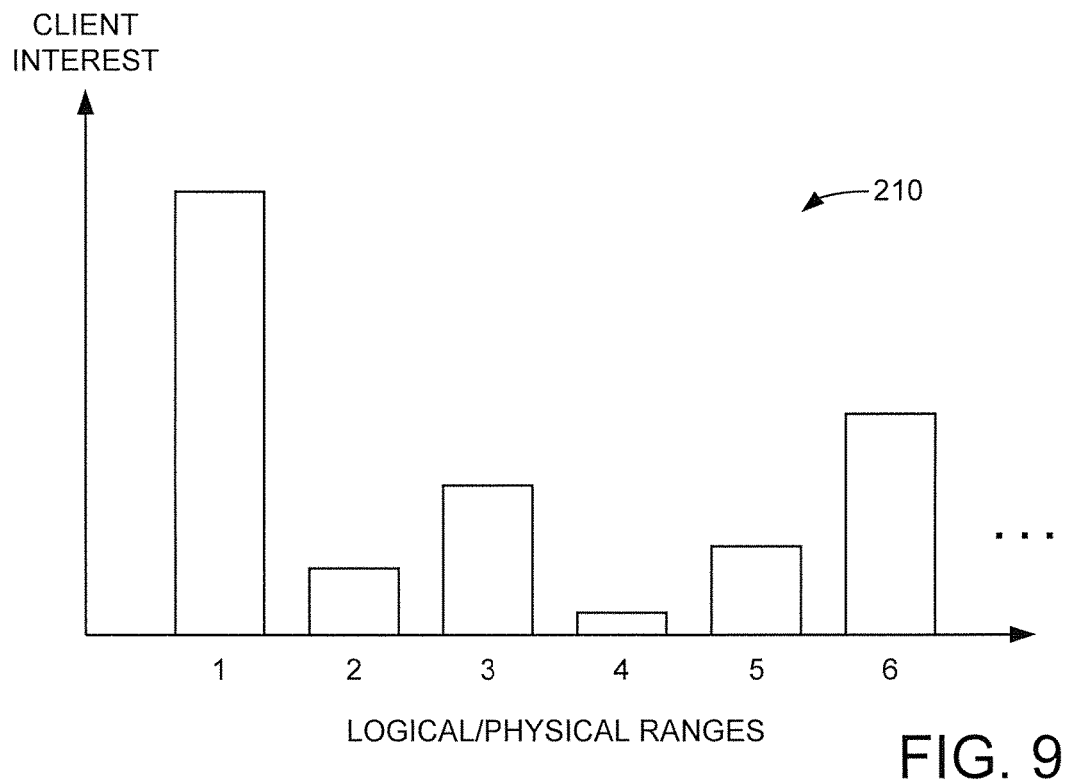
FIG. 9 is a graphical representation of data that may be collected by the metadata manager circuit of FIG. 8.

FIG. 9 shows a graphical representation of a histogram 210 generated by the workload analysis module 204 in some embodiments. Other data analysis techniques can be utilized so this is merely illustrative in nature. The histogram 210 shows different accumulated accesses for different physical/logical ranges. The boundaries of the ranges may or may not align with the segment boundaries for the NVM.

As illustrated in FIG. 9, a first range (Range 1) shows to have the largest amount of client interest for the associated period of time, while the fourth range (Range 4) has relatively little amount of client interest over this same time. The skilled artisan will recognize that these and other forms of analyses can be carried out by the analytics engine of the analysis module 204 to assess both real-time state and historical trends.

From these and other analyses, the module 204 operates to divide out the segments into various groupings. In some embodiments, a first group of segments are referred to as primary segments, each of which exhibit a highest level of client interest based on the current workload. A second group of segments are referred to as secondary segments, each of which exhibits a lowest level of client interest. The respective segments can be sorted based on interest with those above a selected threshold being included in the first group and the rest in the second group. Other mechanisms can be used, including multiple groupings, etc.

Figure 10:
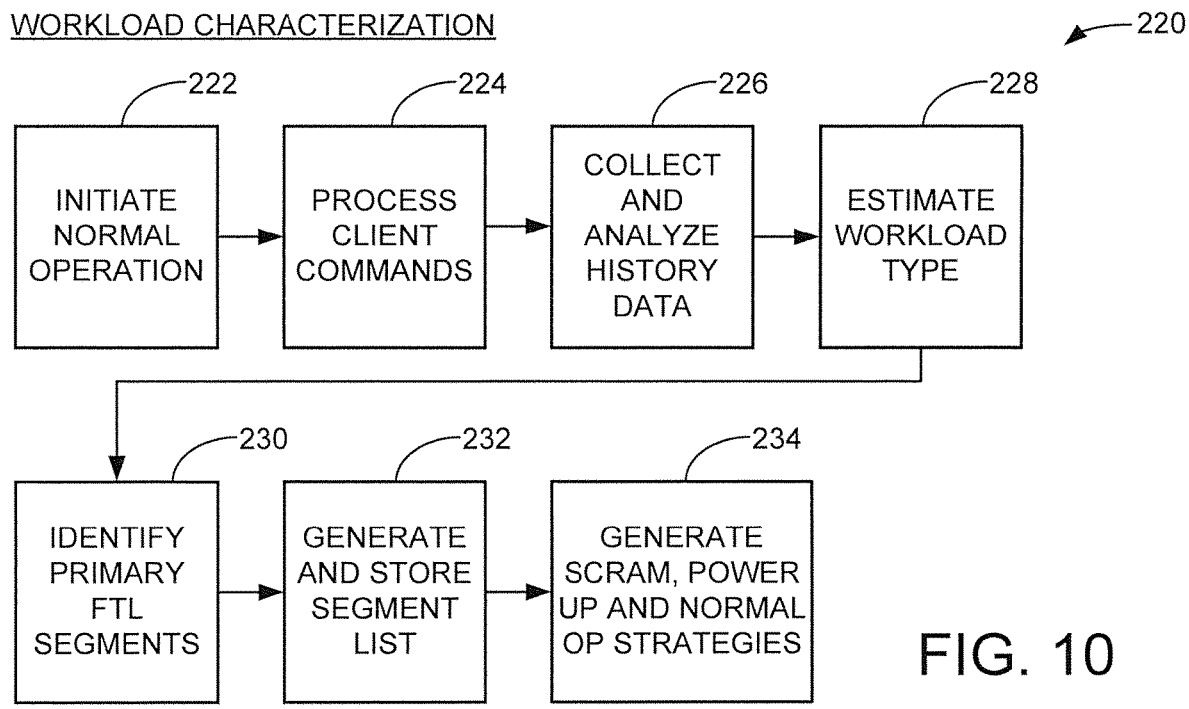
FIG. 10 is a sequence diagram to show workload characterization by the metadata manager circuit in some embodiments.

FIG. 10 is a sequence diagram 220 for a workload characterization sequence carried out by the metadata manager circuit 200 in some embodiments. Once normal operation for the SSD 110 has been initiated at block 222, various client commands (e.g., read, write, status, flush, etc.) are processed at block 224. Historical data associated with these commands are collected and analyzed at block 226 to estimate a current workload type, block 228.

Based on the estimated workload, one or more of the segments 188 of the FTL table 184 will be identified at block 230. As noted above, these segments are referred to as primary FTL segments, and represent those segments that are currently, or are expected in the future, to have significant access levels as compared to the remaining segments (referred to as secondary FTL segments). The primary segments are loaded to the segment list at block 232 and used to generate one or more of the aforementioned scram, power up and normal operational strategies, block 234. Each of these strategies may be separate and independent, or may be interrelated.

As noted above, a suitable scram strategy operates to successfully prepare the SSD 110 for power down. A limited amount of time and power may be available in order to carry out the necessary functions. Standby reserve power may be present in a local power source such as a battery, a storage capacitor, etc. A controlled power down sequence in which external power continues to be supplied to the SSD until the SSD is ready to fully shut down would be considered optimum. In practice, power down events are usually beyond system control, such as in the event of a hard shut down by a user, a power outage, etc. Accordingly, worst case scenarios should be taken into account along with prioritization of those tasks that are most important to be carried out before power is fully lost.

Important tasks to be carried out during scram will depend on the circumstances, but normally these include capturing all map data and ensuring the same is stored to flash, ensuring that all pending client write data have been written to flash or other NVM, and capturing important system parameter and state data that need to be retained for future use.

Figure 11:
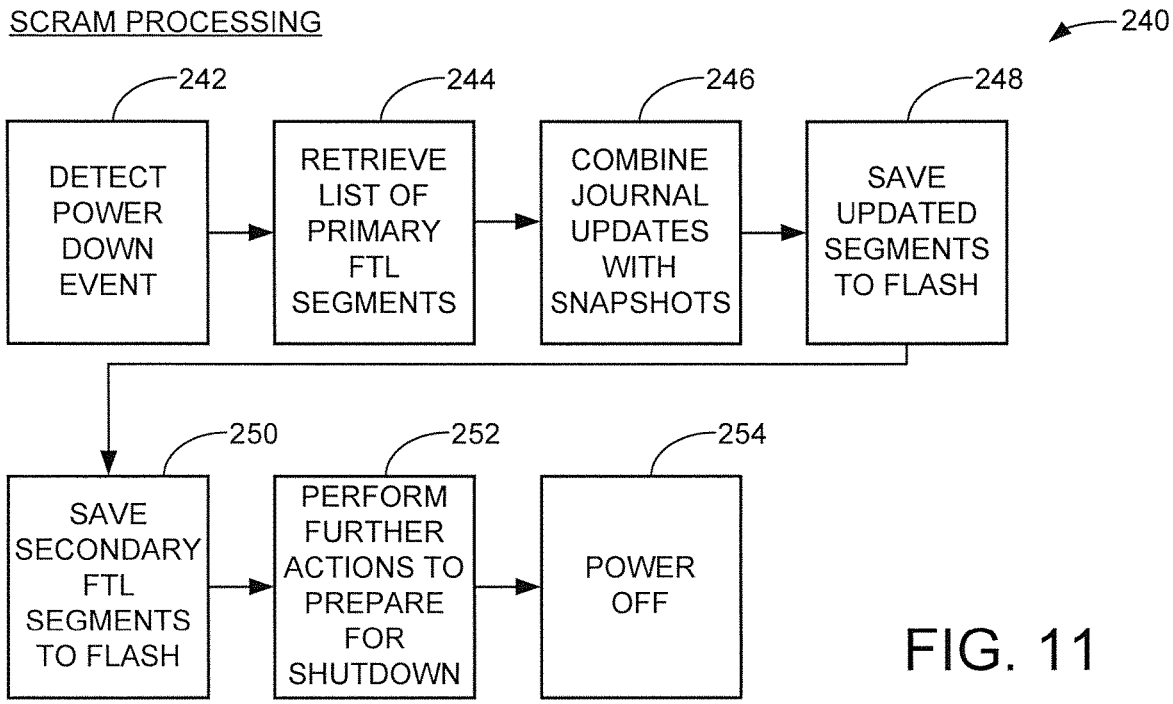
FIG. 11 is a sequence diagram to show scram processing by the metadata manager circuit in some embodiments.

FIG. 11 shows a sequence diagram 240 for a scram processing sequence in some embodiments. Upon detection of a power down event at block 242, the manager circuit 200 retrieves the list of primary FTL segments 208 at block 244, and proceeds to combine the associated journal updates 194 with snapshots 192 to arrive at updated (e.g. current) segments at block 246. The updated segments are stored to flash at block 248. It will be appreciated that the updated segments constitute up-to-date snapshots.

As many of the segments are updated as practical in the allotted time frame. In some cases, there may be sufficient time for the controller 112 to successfully update all of the segments prior to shutdown, but it is contemplated that, because of the time required to perform a segment consolidation operation, along with the fact that these may need to be carried out serially (e.g., one at a time), it may be necessary to only perform some updates, allowing the remaining (secondary) segments to be finally stored as snapshots/journal updates. As noted above in FIG. 7, each segment may require 32 separate consolidation operations, one for each sub-segment, in order to arrive at the updated segment.

Accordingly, the secondary FTL segments are stored to flash at block 250. The secondary segments may be stored in the form of snapshots and updates. Further actions are additionally performed by the controller 112 at block 252, such as the writing of data and parameters. It will be appreciated that it may be necessary to perform data writes prior to map updates to indicate the results of the writes, further extending the scram processing. Once all necessary actions have been taken, the SSD enters a powered down (deactivated) state at block 254.

Figure 12:
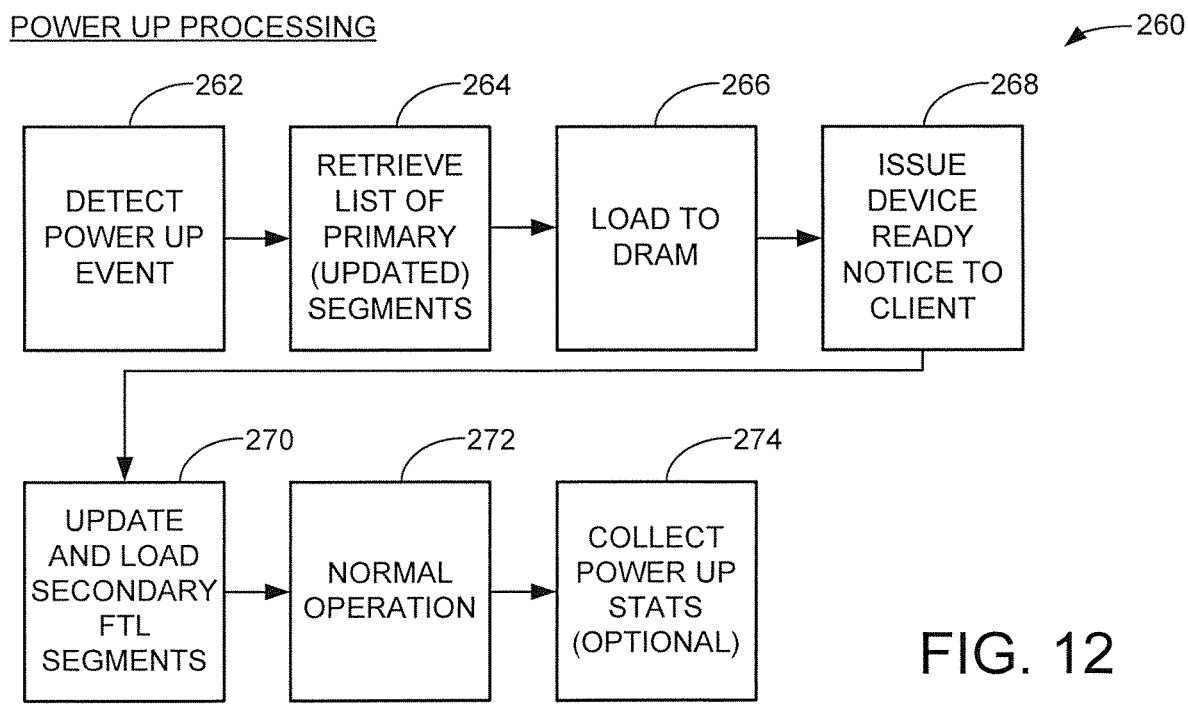
FIG. 12 is a sequence diagram to show power up processing by the metadata manager in some embodiments.

FIG. 12 shows a sequence diagram 260 for a power up processing sequence by the SSD. This may be carried out after the SSD has been successfully powered down in FIG. 11. A power up event is detected at block 262. Both the power up event and the power down event (block 242, FIG. 11) can be detected in a number of ways, including through the detection of a change of voltage on a source line, a notification from an external device, etc. Normal processing commences including BIOS processing to initiate the loading of firmware, etc. as the controller comes on line.

At some point during the initialization process, the manager circuit 200 retrieves the list of primary FTL segments from the segment list 208, as shown by block 264. These segments are located and loaded first to the local memory (DRAM), block 266. Upon successful loading of at least the primary segments, the controller issues a device ready status (notice) to the client device, block 268. This notification signals to the client that the SSD 110 is ready to receive and process client data transfer commands.

From this it can be seen that not only are the primary segments identified in the list 208 those that receive the greatest activity, but the primary segments may also be chosen as those most likely to be utilized first upon device activation. Hence, segments that describe OS (operating system) or other types of files for the client may be included as part of the initial loading process on the basis that these segments have high client interest (even if just upon system initialization). Similarly, segments that store blocks or other data selected by the client as pinned data may also be included as primary segments that are loaded first.

The secondary FTL segments are next loaded at block 270. As noted above, it may be necessary to combine the respective snapshots and journal updates for the secondary segments during this time. These are loaded after the client notification at block 286.

If the SSD has evaluated the workload correctly, the primary segments that were loaded at block 266 should be sufficient in most cases to initially handle the commands issued to the device, allowing the SSD to catch up at block 270. Some commands may be delayed as the secondary segments are requested, but overall it is contemplated that both faster TTR and acceptable levels of data I/O performance will be attained. Normal operation thereafter is carried out at block 272, which may be viewed as that point forward after which all of the segments (or the maximum number of segments that can normally be accommodated) have been updated as needed and loaded to the DRAM. This normal operation includes data collection by the manager circuit 200 as described above, including further workload characterizations (including changes in such).

An optional block 274 indicates that the metadata manager circuit 200 can further operate to evaluate the success of the power up processing sequence. This can be determined in a number of ways, such as accumulating statistics on which segments were initially evaluated and used, which segments were loaded early but not used, which commands were issued after initialization and had to wait for the loading of the associated segments before they could be serviced, and so on. These statistics can provide further historical data that can be incorporated into the history database and used during subsequent scram loading operations.

For example, in a stable initialization environment the client will tend to request data associated with a selected, common number of the segments over a statistically significant number of power up cycles, allowing the SSD over time to load those segments first in order to achieve and maintain fast TTR. In an unstable initialization environment, little or no repeatability is observed from one power up cycle to the next, so that the SSD can focus on those segments that were most recently accessed prior to the last power down. Thus, an adaptive judgment can be made whether it is better to retain a previous workload characterization or begin each new operational mode as a clean slate to determine the current needs of the client.

Figure 13:
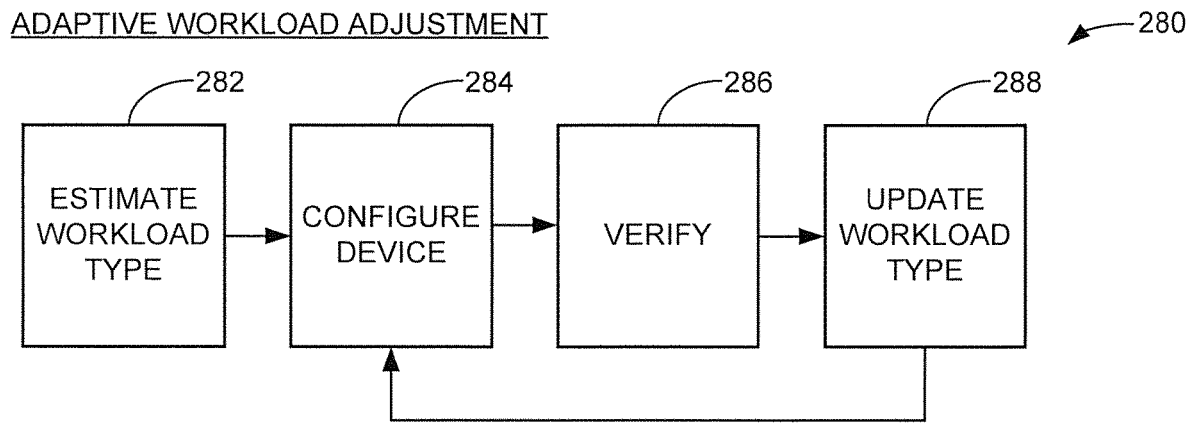
FIG. 13 is a sequence diagram to show adaptive workload adjustment by the metadata manager in some embodiments.

FIG. 13 shows another sequence diagram 280 for an adaptive workload adjustment sequence carried out by the manager circuit 200 in further embodiments. The sequence 280 is carried out during normal operation of the SSD to detect changes in workload over time.

An initial workload is estimated at block 282. Different workloads can be characterized in various ways, but all serve the purpose of enabling the SSD to estimate the current and future needs of the client, both short and long term.

As noted above, one example workload type may be a read dominated environment where a vast majority of the current (and/or anticipated) client commands are read commands. Since read commands require the requested data to be successfully returned (e.g., the client is waiting for the results), read commands are normally given higher priority over other commands. Read commands also do not tend to significantly impact the map metadata apart from the notation of read counts, the monitoring for read disturb (leading to a need to GC and relocate the data), etc.

A write dominated environment places different demands upon the system. On the one hand, there is some flexibility if writeback caching techniques are carried out, since the SSD can report the write command as having been completed while the data are still pending in a local write cache. On the other hand, writes tend to require map metadata updates at a greater rate since forward pointers or other information needs to be captured to indicate the new location for the new write data blocks (as well as the marking of the older version blocks as stale). A write dominated environment may further require a faster rate of GC operations to clear out stale data to make sure there is sufficient capacity in the flash to accommodate the new data.

Other forms of workload characterization can also influence device operation. Logically sequential writes or reads generally result in the transfers of large sections of data with sequential logical addresses (e.g., LBAs), such as in a streaming application. This can provide localized access as well as opportunities for readahead caching, etc. Random writes and reads, on the other hand, may be scattered throughout the flash and require a different strategy. These workload types can be overlapping and are not necessarily mutually exclusive; for example, it is possible to have a write dominated sequential environment or a write dominated random environment, etc.

Continuing with FIG. 13, once a particular workload type has been identified, a change in configuration of the SSD takes place at block 284. This can include a different rate at which GC operations take place, the allocation of additional cache capacity or buffer sizes, a change in cache retention rules, and so on. Block 286 continues to monitor and verify the additional collected history data to confirm the estimated workload type confirms to device operation. As necessary, new workload types may be detected at block 288, which may result in further adaptive changes to the system.

Figure 14:
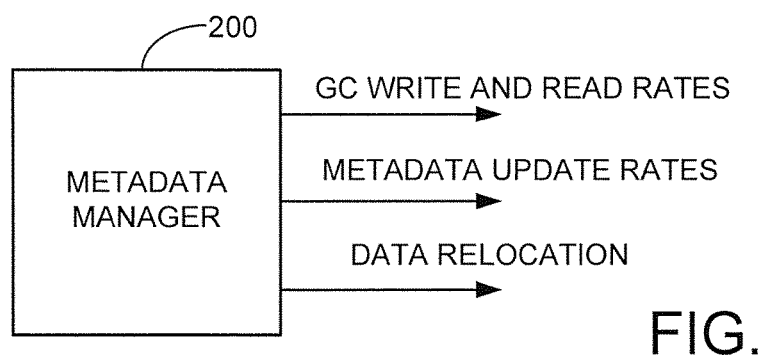
FIG. 14 shows example types of configuration changes made by the metadata manager circuit in some embodiments.

FIG. 14 shows the metadata manager circuit 200 undergoing different device configurations. These can include GC write and read rates, metadata update rates, data relocation operations, and so on. Other configuration changes can be used as desired. These form a portion of the normal operational strategy of the SSD based on the characterized workload, and can help support enhanced operation during both scram and power up sequences.

Figure 15:
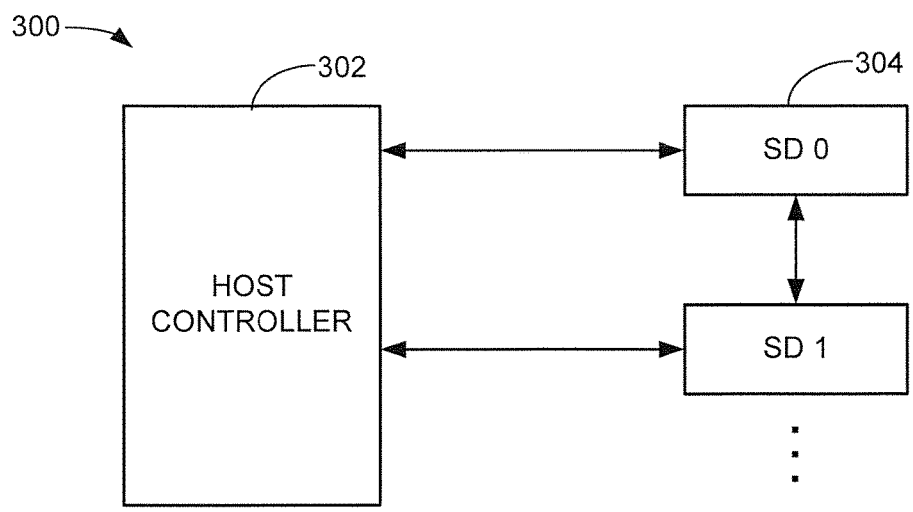
FIG. 15 is a representation of a data handling system having multiple storage devices configured and operated in accordance with some embodiments.

FIG. 15 shows a data handling system 300 in further embodiments. The system 300 includes a client device in the form of a host controller 302 that is connected to a population of storage device 304. The storage devices 304 may correspond to the SSDs discussed above. In this case, workload characterization data may be identified and shared among the respective storage devices 304 as well as with the host controller 302. In some cases, the associated metadata manager circuit(s) of the storage device(s) 304 can request the host controller 302 to supply anticipated workload information to enable the device(s) to detect the workload and perform configuration operations accordingly.

The proper number and ordering of segments to be loaded at time of device ready will depend on the requirements of a given application. In some cases, an initial number, such as X percentage of the total number of segments (e.g., 50%, 80%) that can be fully loaded may be sufficient to enable the device ready signal to the client. This can be monitored and adjusted up or down over time.

While various embodiments presented herein have been described in the context of an SSD, it will be appreciated that the embodiments are not so limited. The various embodiments have particularly suitability for use in an NVMe environment, including one that supports deterministic (IOD) modes of operation in which specified levels of performance are guaranteed for selected intervals.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method, comprising:
    maintaining map data in a local memory to describe a non-volatile memory (NVM) of a storage device, the map data comprising a plurality of segments each arranged as snapshots and intervening journal updates;
    dividing the segments into primary segments having a highest level of client interest and secondary segments having a lowest level of client interest in relation to a detected workload from a client device;
    during a scram interval, updating the primary segments by combining the associated snapshots and journal updates to generate updated primary segments, and storing the updated primary segments and the secondary segments to the NVM; and
    during a subsequent power up interval, loading the updated segments to the local memory, followed by issuing a device ready indication to the client device that the storage device is ready to receive data transfer commands, followed by updating and loading the secondary segments to the local memory.

2. The method of claim 1, further comprising accumulating history data associated with data transfer commands issued to the storage device from the client device, and identifying the workload in relation to the accumulated history data.

3. The method of claim 1, wherein the detected workload is at least a selected one of a write dominated environment, a read dominated environment, a sequential access environment or a random access environment.

4. The method of claim 1, wherein the storage device operates to update and store the updated primary segments to the NVM during the scram interval responsive to an indication of imminent power loss and prior to an actual loss of power to the storage device.

5. The method of claim 4, wherein the changing of the configuration of the storage device comprises changing a rate at which garbage collection (GC) operations are carried out to free up new space in the NVM.

6. The method of claim 4, wherein the changing of the configuration of the storage device comprises changing a rate at which the segments are updated with new snapshots which are stored to the NVM.

7. The method of claim 1, further comprising changing a configuration of the storage device responsive to the detected workload prior to the scram interval.

8. The method of claim 1, wherein the segments form a flash transition layer (FTL) map structure to provide a logical to physical association between data blocks stored to the NVM.

9. The method of claim 1, further comprising monitoring the data transfer commands issued by the client device after the loading of the updated primary segments and adjusting the group of updated primary segments loaded during a subsequent power up interval in relation to the monitored data transfer commands.

10. The method of claim 1, wherein the associated snapshots and journal updates are combined to form updated snapshots for each of the primary segments prior to power down of the storage device, and wherein the associated snapshots and journal updates are not combined for each of the secondary segments prior to power down of the storage device.

11. The method of claim 10, wherein the associated snapshots and journal updates are combined to form updated snapshots for each of the secondary segments after the device ready indication is issued to the client device.

12. A data storage device, comprising:
    a non-volatile memory (NVM) arranged to store user data blocks from a client;
    a map metadata structure stored in a local memory to provide a logical to physical association of addresses of the user data blocks, the map data arranged as a plurality of segments each comprising a sequence of snapshots and intervening journal updates; and
    a metadata manager circuit configured to detect an existing workload from the client responsive to accumulated history data associated with operation of the NVM, to update a first set of segments having a highest level of client interest in relation to the workload prior to a shutdown event, to update a remaining second set of segments having a lowest level of client interest in relation to the workload after a subsequent power up event, the metadata manager circuit providing a device ready indication to the client after loading the updated first set of segments to the local memory and prior to loading the updated second set of segments to the local memory.

13. The storage device of claim 12, characterized as a solid-state drive (SSD), wherein the NVM comprises flash memory.

14. The storage device of claim 13, wherein the metadata manager further stores the associated snapshots and journal updates for the second set of segments to the NVM during the scram interval prior to the loss of power to the storage device.

15. The storage device of claim 12, wherein the metadata manager circuit updates the first set of segments during a scram interval by combining the associated snapshots and journal updates and storing the updated first set of segments to the NVM prior to a loss of power to the storage device.

16. The storage device of claim 12, wherein the metadata manager circuit further operates to adjust a rate of at least a selected one of garbage collection (GC) operations, metadata updates and data relocation operations responsive to the detected workload.

17. The storage device of claim 12, wherein the metadata manager circuit is further configured to request anticipated workload information from the client and to select the first group of segments responsive to the anticipated workload information.

18. A solid-state drive (SSD), comprising:
- a flash memory comprising a plurality of semiconductor flash dies arranged to store memory in associated flash memory cells;
- a controller circuit configured to manage data transfers between the flash memory and a client device, the controller circuit adapted to:
  - arrange map metadata in a local memory to associate logical to physical addresses of data blocks stored in the NVM, the map metadata comprising a plurality of segments;
  - detect a workload associated with the client device responsive to accumulated history data, and use the detected workload to identify primary segments and secondary segments;
  - update the primary segments by combining snapshots with journal updates while not updating the secondary segments in response to an indication of an imminent power loss;
  - provide a device ready indication to the client device after a subsequent power up condition;
  - load the updated primary segments to the local memory prior to the device ready indication; and
  - update the secondary segments by combining snapshots with journal updates and loading the updated secondary segments to the local memory after the device ready indication.

19. The SSD of claim 18, wherein the controller circuit further operates to change an operational configuration of the storage device responsive to the detected workload to maintain a selected data input/output (I/O) data transfer rate with the client device prior to receipt of the indication of an imminent power loss.

20. The SSD of claim 18, wherein the controller circuit further operates to monitor subsequent data transfer commands received from the client and to adjust the arrangement of primary and secondary segments for a subsequent power cycle event.

* * * * *